United States Patent [19]

Grey

[11] Patent Number: 5,115,060

[45] Date of Patent: May 19, 1992

[54] ALTERNATING COPOLYMERS OF OLEFINICALLY UNSATURATED SULFONATE SALTS AND UNSATURATED IMIDES

[75] Inventor: Roger A. Grey, West Chester, Pa.

[73] Assignee: Arco Chemical Technology, L.P., Wilmington, Del.

[21] Appl. No.: 616,977

[22] Filed: Nov. 21, 1990

[51] Int. Cl.⁵ ............................................. C08F 22/40
[52] U.S. Cl. .................................... 526/262; 526/287
[58] Field of Search ............................... 526/262, 287

[56] References Cited

U.S. PATENT DOCUMENTS 4,540,762  9/1985  Turner ................................. 526/262
4,652,621  3/1987  Kadono et al. ..................... 526/262

Primary Examiner—Joseph L. Schofer
Assistant Examiner—Alex H. Walker
Attorney, Agent, or Firm—Stephen D. Harper

[57] ABSTRACT

Copolymers of olefinically unsaturated sulfonate salts such as sodium methallylsulfonate and $\alpha,\beta$-unsaturated dicarboxylic acid imide such as maleimide are produced by free radical polymerization. The copolymers and their derivatives are useful as water-soluble dispersants.

19 Claims, No Drawings

ALTERNATING COPOLYMERS OF OLEFINICALLY UNSATURATED SULFONATE SALTS AND UNSATURATED IMIDES

This invention pertains to copolymers of olefinically unsaturated sulfonate salts and $\alpha,\beta$-unsaturated dicarboxylic acid imides and derivatives of such copolymers which are useful as water soluble dispersants. In a preferred embodiment, the copolymers are alternating in structure and contain approximately equimolar amounts of the sulfonate salts and dicarboxylic acid imides.

BACKGROUND OF THE INVENTION

Water-soluble polymers containing pendent sulfonate groups have found wide utility as dispersants, scale and corrosion-preventing agents, detergent builders, sequestering agents, suspending agents, flame retardants, and the like. Polymers containing sulfonate groups are commonly prepared by polymerization of unsaturated sulfonate salt monomers. Carboxylate groups may be introduced into such polymers by copolymerizing an unsaturated dicarboxylic acid, acid salt, or anhydride with the unsaturated sulfonate salt. Copolymers of this type are described, for example, in Jpn. Kokai 149,705/75, 213,714/84, and 50064/79 and in European Pat. No. 353,817.

The usefulness of such copolymers as dispersants and the like is significantly affected by characteristics such as monomer composition, structure, and molecular weight. Therefore, it would be highly desirable to obtain sulfonate copolymers wherein the comonomer is an $\alpha,\beta$-unsaturated dicarboxylic acid imide so that copolymer properties may be varied as required to suit particular end-use applications.

SUMMARY OF THE INVENTION

This invention provides a copolymer comprised of recurring polymerized units of an olefinically unsaturated sulfonate salt and recurring polymerized units of an $\alpha,\beta$-unsaturated dicarboxylic acid imide having a peak molecular weight of from about 500 to 30,000. The structure of the copolymer is preferably alternating, wherein the sulfonate salt and dicarboxylic acid imide recurring polymerized units are present in approximately equimolar ratio.

Also provided by this invention is a copolymer comprised of recurring polymerized units of an olefinically unsaturated sulfonate salt and recurring polymerized units of an $\alpha,\beta$-unsaturated dicarboxylic acid imide wherein at least a portion of the $\alpha,\beta$-unsaturated dicarboxylic acid imide recurring polymerized units are converted to non-cyclic dicarboxylate moieties. Each dicarboxylate moiety has (a) a first carboxylic acid amide functional group, and (b) a carboxylate functional group selected from the group consisting of (i) a carboxylic acid amide functional group, (ii) a carboxylic acid salt functional group, (iii) a carboxylic acid ester functional group, and (iv) a second carboxylic acid amide functional group which is the same as or different from the first carboxylic acid amide functional group.

DETAILED DESCRIPTION OF THE INVENTION

The novel copolymers of this invention contain recurring polymerized units of an olefinically unsaturated sulfonate salt and recurring polymerized units of an $\alpha,\beta$-unsaturated dicarboxylic acid imide. Optionally, recurring polymerized units of an $\alpha,\beta$-unsaturated dicarboxylic acid anhydride may also be present. The relative proportions of the different types of recurring polymerized units may be varied as desired but preferably the molar proportions of (imide + anhydride):sulfonate salt vary from about 80:20 to 20:80.

In a preferred embodiment of this invention, a copolymer comprised of recurring polymerized units of an olefinically unsaturated sulfonate salt and recurring polymerized units of an $\alpha,\beta$-unsaturated dicarboxylic acid imide and having a substantially alternating structure is obtained. The sulfonate salt recurring polymerized units (A) alternate with $\alpha,\beta$-unsaturated dicarboxylic acid imide recurring polymerized units (B) in the following manner:

-A-B-A-B-A-B-

While recurring units of the same type may occasionally be adjacent to each other (e.g., -A-A-B-A-), it is preferred that the number of such adjacent similar units be minimized. The olefinically unsaturated sulfonate salt and $\alpha,\beta$-unsaturated aliphatic dicarboxylic acid imide recurring polymerized units are consequently present in an approximately equimolar ratio (i.e., about 50 mole percent of each).

The copolymer of this invention has a moderately high molecular weight of from about 500 to 30,000. Most preferably, however, the molecular weight is from about 1500 to 20,000. In this context, molecular weight refers to the peak molecular weight measured by gel permeation chromatography relative to sulfonated polystyrene calibration standards.

The olefinically unsaturated sulfonate salt recurring polymerized units ma be derived from any polymerizable unsaturated compound containing at least one sulfonate salt functional group. In general, the preferred structure of the olefinically unsaturated sulfonate recurring polymerized units is

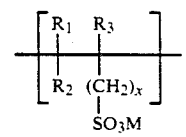

wherein $R_1$, $R_2$, and $R_3$ are the same or different and are independently selected from the group consisting of hydrogen, aryl and $C_1-C_6$ alkyl, x is 0, 1, or 2, and M is an alkali metal, alkaline earth or ammonium. In this context, "ammonium" refers to $NH_4$ as well as to organoammonium moieties such as $NHEt_3$, $NBu_4$, $NH_3Ph$, and $NH_3Me$. Most preferably, $R_1$ and $R_2$ are hydrogen, $R_3$ is hydrogen or methyl, x is 0 or 1 and M is sodium or potassium since the corresponding monomers (sodium vinyl sulfonate, potassium vinyl sulfonate, sodium allyl sulfonate, potassium allyl sulfonate, sodium methallyl sulfonate, potassium methallyl sulfonate) are readily available and highly reactive when copolymerized with $\alpha,\beta$-unsaturated dicarboxylic acid imides under the reaction conditions of this invention. In addition, the copolymers prepared from these preferred monomers have exceptionally high water solubility. Mixtures of different unsaturated sulfonate salts may be employed if desired.

The $\alpha,\beta$-unsaturated dicarboxylic acid imide recurring polymerized units can be derived from any cyclic polymerizable imide having a carbon-carbon double bond in conjugation with at least one of the carbon-oxygen double bonds. The α,β-unsaturated dicarboxylic acid imide recurring polymerized units preferably have the general structure:

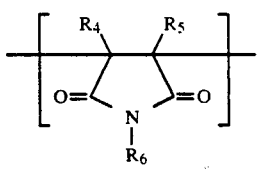

wherein $R_4$, and $R_5$, and $R_6$ are the same or different and are independently selected from the group consisting of hydrogen, aralkyl, alkyl, and aryl. Specific examples of suitable substituents include $C_1-C_6$ alkyl groups such as methyl, ethyl, n-propyl, isopropyl, n-butyl, 2-butyl, isobutyl, t-butyl, n-pentyl, t-amyl, n-hexyl, cyclohexyl, and the like, as well as aryl groups such as phenyl, tolyl, halophenyl, nitrophenyl, xylyl, mesityl, cumenyl, naphthyl, and anthryl, and aralkyl groups such as benzyl and phenethyl. Maleimide (i.e., where $R_4$, $R_5$ and $R_6$ are hydrogen) is the preferred imide monomer since it is readily available, highly reactive, and imparts good water solubility to the copolymer. Other imides such as N-phenylmaleimide, N-methylmaleimide, N-ethyl maleimide, N-propyl maleimide, N-isopropyl maleimide, N-cyclohexyl maleimide, N-(2-chlorophenyl) maleimide, N-(3-chlorophenyl) maleimide, N-(4-chlorophenyl) maleimide, N-(2,4,6-tribromophenyl) maleimide, N-(4-t-butyl phenyl) maleimide, and mixtures thereof (including mixtures with maleimide) may also be employed, however.

In another embodiment of this invention, the copolymer may be additionally comprised of α,β-unsaturated dicarboxylic acid anhydride recurring polymerized units. The optional anhydride recurring polymerized units preferably have the general structure:

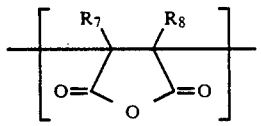

wherein $R_7$ and $R_8$ are the same or different and are independently selected from the group consisting of hydrogen, aralkyl, alkyl, and aryl. Specific examples of suitable $R_7$ and $R_8$ substituents include $C_1-C_6$ alkyl groups such as methyl, ethyl, n-propyl, isopropyl, n-butyl, 2-butyl, isobutyl, t-butyl, n-pentyl, t-amyl, n-hexyl, cyclohexyl, and the like as well as aryl groups such as phenyl, tolyl, halophenyl, nitrophenyl, xylyl, mestyl, cumenyl, naphthyl, and anthryl, and aralkyl groups such as benzyl and phenethyl. Maleic anhydride (i.e., where $R_7$ and $R_8$ are hydrogen) is the preferred optional anhydride for use, but other anhydrides such as itaconic anhydride, citraconic anhydride, ethyl maleic anhydride, methyl itaconic anhydride, chloromaleic anhydride, bromomaleic anhydride, tetrahydrophthalic anhydride, and mixtures thereof may also be employed. The ratio of sulfonate salt:imide:anhydride recurring polymerized units may be varied as desired to alter the physical properties, characteristics, and performance of the copolymers of this invention.

The copolymer described above may be prepared by reacting the desired proportions of the α,β-unsaturated dicarboxylic acid imide, olefinically unsaturated sulfonate salt, and optional α,β-unsaturated dicarboxylic acid anhydride in the presence of a solvent and an effective amount of a free radical initiator. Preferably, the molar ratio of (imide + anhydride):sulfonate is from about 80:20 to 20:80, but most preferably is from about 1.1:1 to 1:1.1. The free radical initiator may be a hydroperoxide, persulfate, peroxide, perborate, percarbonate, or azo compound.

However, azo compounds are most preferred for use in the preparation of the copolymers of this invention as such initiators tend to more readily yield copolymers having molecular weights in the desired range and having alternating structures. Initiators of this type are particularly useful if a polar organic solvent is employed as the reaction medium. Illustrative azo free radical initiators include 2,2'-azo-bis-isobutyronitrile(AIBN), 2,2'-azo-bis(2-methyl butane nitrile), 1,1'-azo-1-cyclohexane carbonitrile, 4,4'-azo-4-cyanopentanoic acid, 2,2'-azobis-(4-methoxy-2,4-dimethylpentane nitrile), 2,2'-azobis-(2-acetoxy-propane), 2-(tert-butylazo)-2,4-dimethylpentane nitrile, and other azo compounds containing at least one tertiary carbon attached to azo nitrogen. Persulfate initiators such as potassium persulfate are suitable for use if the copolymerization is to be carried out in an aqueous or alcoholic medium. Mixtures of free radical initiators may be used, if desired. The amount of free radical initiator should be sufficient to accomplish substantial copolymerization of the monomers under the reaction conditions employed. In general, concentrations of from about 0.1 to 10 weight percent based on the total weight of monomers will be suitable. It may be desirable to add the initiator in portions to the reaction mixture during copolymerization.

While the choice of solvent is generally not critical to the preparation of the copolymers of this invention, it is desirable to employ a solvent in which the monomers selected are substantially soluble at the polymerization temperature. Due to the polar character of the monomers, the use of polar solvents is preferred. Additionally, unless conversion of the cyclic imide functionality of the α,β-unsaturated dicarboxylic acid imide during polymerization is desired, it is preferred to select a solvent which is substantially non-reactive with the imide under the reaction conditions used. For example, if a nucleophilic solvent such as water or an alcohol is used, the reaction temperature should be kept below about 75° C. if ring-opening of the imide ring is to be avoided. Under these circumstances, the use of an initiator such as persulfate which is activated at a relatively low temperature is preferred.

The use of a non-reactive polar organic solvent is especially preferred in the preparation of alternating copolymers containing intact imide rings. Without wishing to be bound by theory, it is believed that the ability to form such alternating copolymers using such solvents is related to the formation of a soluble 1:1 charge transfer complex between the olefinically unsaturated sulfonate salt and the α,β-unsaturated dicarboxylic acid imide monomers. The presence of the cyclic imide functionality in the latter comonomer is thought to be necessary in order for such a complex to form. The solvent used must therefore be sufficiently polar to dissolve this charge transfer complex but not so strong a solvent that it disrupts the complex by solubilizing each component individually or by reacting with the imide to form a non-cyclic species.

Aliphatic carboxylic acids having from one to three carbon atoms and alkyl amides of $C_1$-$C_3$ carboxylic acids are particularly well suited for use as non-reactive polar organic solvents in the preparation of the copolymers of this invention. Preferred solvents include acetic acid, propionic acid, dimethyl formamide, dimethyl propionamide, dimethyl acetamide, diethyl formamide, and the like or mixtures thereof. Glacial acetic acid is the most preferred solvent.

When a non-reactive polar organic solvent is used, the polymerization temperature is not limited to the same extent as when reactive solvents such as water or alcohols are employed. The azo free radical initiators described herein above are particularly useful in combination with the non-reactive polar organic solvents at higher reaction temperatures (preferably, from about 75° C. to 150° C.).

It is generally desirable to exclude oxygen as much as possible during copolymerization. This may be accomplished by keeping the reaction mixture under an inert atmosphere of nitrogen, argon, or the like.

The amount of solvent used should be sufficient to dissolve at least a major portion of the monomers at the reaction temperature employed. In general, the weight of solvent should be from about 1 to 5 times the total weight of monomers. The reaction time and temperature will depend on the particular free radical initiator, solvent, and monomers used. The comonomers are heated for a time and at a temperature effective to accomplish substantial (preferably, over 75%) conversion of each of the comonomers. Reaction times of from about 1 to 48 hours will generally be sufficient. Temperatures of from about 25° C. to 150° C. are usually preferred, subject to the guidelines discussed above in reference to the choice of solvent. The copolymerization may be carried out by a batch or continuous process in any suitable vessel, although it is usually desirable to mix the components by agitation.

The copolymer thus produced may be separated from the reaction mixture and isolated by any convenient method known in the art for the recovery of polymers. For example, the copolymer if dissolved in the reaction solvent may be precipitated by addition of a suitable quantity of a non-solvent and then collected by filtration, decantation, centrifugation or similar procedures. The collected copolymer may then be washed with a non-solvent to remove impurities and dried by any suitable means.

In another aspect of this invention, the cyclic imide functionality of the copolymers of the type hereinabove described may be fully or partially reacted with a suitable reagent to form a copolymer having non-cyclic dicarboxylate moieties. The sulfonate salt groups may also be acidified to form pendent sulfonic acid groups. The resulting copolymer products will be comprised of (A) optionally, recurring polymerized units of an olefinically unsaturated sulfonate salt, (B) optionally, recurring polymerized units of an olefinically unsaturated sulfonic acid, (C) optionally, recurring polymerized units of an $\alpha,\beta$-unsaturated dicarboxylic acid imide, and (D) recurring polymerized units of a dicarboxylate moiety having (a) a first carboxylic acid amide functional group, and (b) a carboxylate functional group selected from the group consisting of (i) a carboxylic acid functional group, (ii) a carboxylic acid salt functional group, (iii) a carboxylic acid ester functional group, and (iv) a second carboxylic acid amide functional group which is the same or different than the first carboxylic acid amide functional group. The copolymer must contain recurring polymerized units of either type A (olefinically unsaturated sulfonate salt) or type B (olefinically unsaturated sulfonic acid), however. More than one type of carboxylate functional group may be present. In a preferred embodiment of the invention, the total amount of (A) and (B) and the total amount of (C) and (D) are each about 50 mole percent [i.e., the molar ratio of $(A+B):(C+D)$ is about 50:50]. In this preferred embodiment, the total amount of type (A) and (B) recurring polymerized units is from 0 to about 50 mole percent, the amount of type (C) recurring polymerized units is from 0 to about 49 mole percent, and the amount of type (D) recurring polymerized units is from about 1 to 50 mole percent. The peak molecular weight of the copolymer is from about 500 to 30,000, but more preferably is from about 1500 to 6000.

The first carboxylic acid amide functional group may preferably have the following general structure:

wherein $R_6$ is as defined previously for the $\alpha,\beta$-unsaturated dicarboxylic acid imide recurring polymerized units.

The carboxylate functional group may, for example, have the general structure:

wherein Y is O (oxygen) or NZ wherein Z is hydrogen, aryl or $C_1$-$C_6$ alkyl and X is hydrogen, ammonium, $C_1$-$C_6$ alkyl, aryl, alkali metal or alkaline earth, with the proviso that when Y is NZ, X is either hydrogen, aryl or $C_1$-$C_6$ alkyl. For example, YX may be OH, $NH_2$, $NEt_2$, NHMe, ONa, OK, $ONH_4$, NHPh, $OCa_{0.05}$, or the like. "Aryl" in this context means a phenyl or naphthyl which may be substituted with one or more substituents other than hydrogen such as alkyl, halo, alkoxy, or other groups. The physical and chemical properties of the resulting copolymer having non-cyclic dicarboxylate moieties may be controlled as desired by varying the structure of the functional groups and the degree of conversion of the imide groups in the parent copolymer. Any conventional method of converting imide functional groups to carboxylic acid, carboxylic acid ester, carboxylic acid amide, or carboxylic acid salt groups may be employed. Such methods are well-known and are described, for example, in Wheeler, et al., "Chemistry of Imidic Compounds" in Zabicky, "The Chemistry of Amides", Chapter 7, pp. 362–375 (1970) and Hargreaves et al. *Chem. Rev.* 70, pp 439–469 (1970).

For example, the imide-containing copolymer may be reacted with a strong base such as an alkali metal or alkaline earth hydroxide or ammonium hydroxide to hydrolyze the imide functional group to a carboxylic acid amide and a carboxylic acid salt. In a preferred embodiment of this invention, this reaction may be represented as follows:

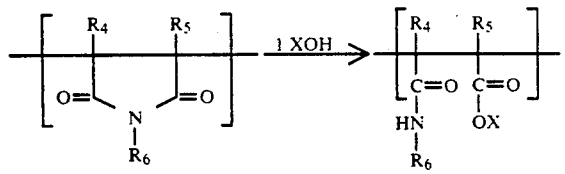

wherein $R_4$, $R_5$ and $R_6$ are the same or different and are independently selected from the group consisting of hydrogen, aryl and $C_1$-$C_6$ alkyl and X is ammonium ($NH_4$) or an alkali metal such as sodium or potassium. This neutralization is most preferably accomplished by dissolving the parent copolymer in an appropriate solvent such as water and combining the copolymer solution with an aqueous solution of the hydroxide. The degree of neutralization desired can be readily adjusted by controlling the number of equivalents of strong base added per equivalent of imide in the parent copolymer. The copolymer product containing pendent carboxylic acid amide and carboxylate salt groups may be isolated and purified if desired by any conventional technique such as extraction or solvent-nonsolvent precipitation. The carboxylic acid salt functional groups may be converted to carboxylic acid functional groups by treating with a protic acid.

Alternatively, the imide functional groups in the parent copolymer may be converted to carboxylic acid amides by reaction with ammonia or a primary or secondary amine. This reaction may be represented as follows for a preferred embodiment of this invention:

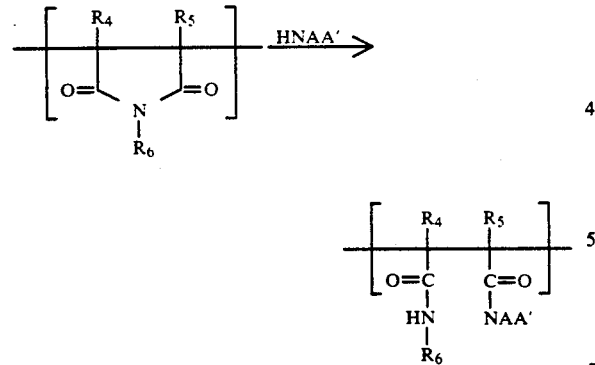

wherein $R_4$, $R_5$ and $R_6$ are the same or different and are independently selected from the group consisting of hydrogen and $C_1$-$C_6$ alkyl and A and A' are the same or different and are independently selected from the group consisting of hydrogen and $C_1$-$C_6$ alkyl. $R_4$, $R_5$, A, and A' may also be aryl, alkylaryl, haloaryl, or aralkyl, as well as any other organic substituent.

The cyclic imide group may also be hydrolyzed under acidic conditions to yield carboxylic acid functional groups. This reaction may be illustrated as follows:

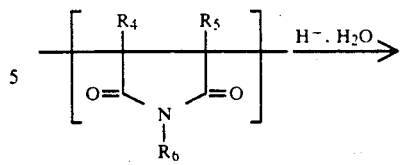

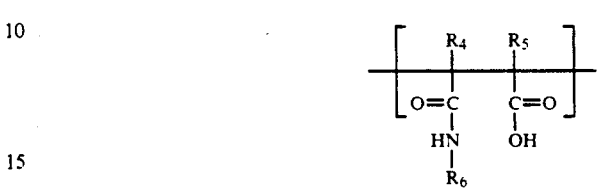

Acidification of the parent copolymer using a strong acid such as sulfuric acid or other acid having a low pKa value will convert the sulfonate salt groups present to sulfonic acid groups:

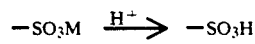

Partial acidification will, of course, result in a copolymer containing both sulfonate salt and sulfonic acid groups. Contact with weak acids such as acetic acid (a preferred solvent for the copolymerization) generally will not affect the sulfonate salt functionality.

Reaction of the imide functionality with an alcohol will yield a dicarboxylate moiety containing both a carboxylic acid amide group and a carboxylic acid ester group. The reaction may be catalyzed by either acid or base. This synthetic transformation may be characterized in a preferred embodiment as follows:

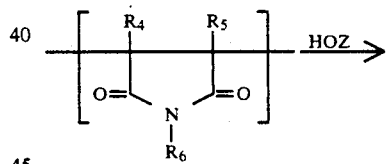

wherein Z is most preferably a $C_1$-$C_6$ alkyl group, aralkyl or aryl group.

Due to their high solubility in water and the presence of sulfonate salt functional groups, as well as other highly polar functional groups such as carboxylic acid salt functional groups, the copolymers of this invention and their derivatives may be used as dispersing agents. The compositions are particularly useful as components of water-based drilling fluid compositions. Drilling fluid compositions are commonly employed when drilling subterranean wells such as oil or gas wells. Dispersing agents are added to such drilling fluid compositions in order to disperse the drilling fluid, reduce the rate of filtrate loss, stabilize clays, flocculate drilled solids, increase carrying capacity, emulsify, lubricate, and the like.

The copolymers of this invention may also be advantageously employed as builders for detergent compositions to improve the cleaning efficiency of the surfactant. The compositions may additionally be used as scale control agents to inhibit the deposition of scale deposits in aqueous systems, as inorganic pigments, as cement mixing agents, as flame retardant agents for polymeric resins, and as deflocculants.

Without further elaboration, it is believed that one skilled in the art can, using the preceding description, utilize the present invention to its fullest extent. The following examples, therefore, are to be considered as merely illustrative and not limitative of the claims or remainder of the disclosure in any way whatsoever.

EXAMPLE 1

Copolymerization of Sodium Methallylsulfonate and Maleimide

A 150 mL glass reactor was charged with recrystallized sodium methallylsulfonate (9.5 g; 0.06 mole), maleimide (6.0 g; 0.06 mole), and 40 g of glacial acetic acid. The reaction mixture was degassed by freeze-thawing three times under vacuum. After inletting argon, AIBN (780 mg; 5.2 weight percent based on monomer charge) was added and the mixture heated 18 hours at 80° C. in an oil bath. After cooling to 23° C., the precipitated copolymer which formed was collected by filtration and washed with glacial acetic acid. The copolymer product was dried in a vacuum oven at 80° C. (1 torr) until a constant weight of 12.4 g (80% yield) was obtained. A peak molecular weight of 2000 was measured by gel permeation chromatography using sulfonated polystyrene calibration standards. The elemental and $^{13}$C NMR analyses were consistent with a 1:1 alternating copolymer having the structure:

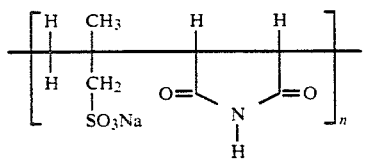

EXAMPLE 2

Conversion of the Copolymer of Example 1 to a Copolymer Containing Carboxylic Acid Amide and Carboxylic Acid Salt Functional Groups The copolymer obtained in Example 1 (7.7 g; containing 0.03 mole equivalents of imide groups) was dissolved in 10 g of deionized water. A solution of 1.2 g (0.03 mole) sodium hydroxide in 2 g water was added to the copolymer solution to adjust the pH to approximately 11. The resulting solution was added to 150 mL methanol with stirring to precipitate the reacted copolymer. The precipitated copolymer was isolated by filtration, washed with methanol, and then dried to a constant weight of 9.0 g in an 80° C. vacuum oven (1 torr). The structure of the alternating copolymer thus produced was as follows:

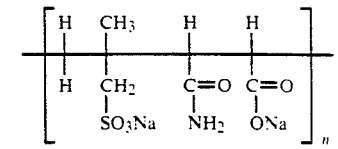

EXAMPLE 3

Copolymerization of Sodium Methallylsulfonate and N-Phenylmaleimide

A 150 mL glass reactor was charged with recrystallized sodium methallylsulfonate (9.5 g; 0.060 mole), N-phenylmaleimide (11.2 g; 0.064 mole), and 40 g glacial acetic acid. The reaction mixture was degassed by freeze-thawing three times under vacuum. After inletting argon, AIBN (780 mg) was added and the mixture heated 18 hours at 80° C. in an oil bath. Approximately one half of the acetic acid was then removed by distillation. Ethylbenzene (60 mL) was added while stirring the reaction solution to form a precipitate. The precipitate was collected by filtration, washed once with ethylbenzene, and twice with hexanes. The copolymer product was dried in a vacuum oven at 80° C. until a constant weight of 18 g (87% yield) was obtained. A peak molecular weight of 3000 using sulfonated polystyrene calibration standards was measured by gel permeation chromatography. The elemental and $^{13}$C NMR analyses were consistent with a 1:1 alternating copolymer having the structure:

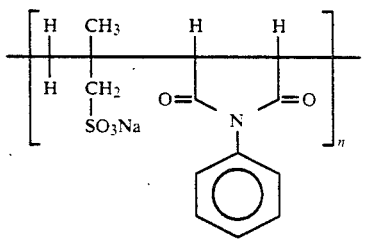

EXAMPLE 4

Conversion of the Copolymer of Example 3 to a Copolymer Containing Carboxylic Acid Amide and Carboxylic Acid Salt Functional Groups The copolymer obtained in Example 3 (10 g; 0.03 mole equivalents of imide groups) was dissolved in 20 g deionized water. A solution of 1.2 g (0.03 mole) sodium hydroxide in 2 g water was added to the copolymer solution to adjust the pH to approximately 11. The resulting solution was added with stirring to 400 mL isopropanol to precipitate the reacted copolymer. The precipitated copolymer was isolated by filtration, washed with isopropanol, and dried to a constant weight of 9.5 g in an 80° C. vacuum oven (1 torr). The structure of the alternating copolymer thus produced was as follows:

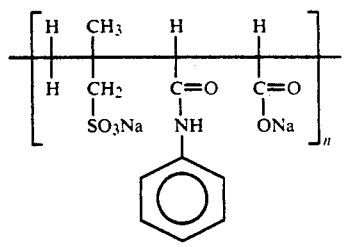

EXAMPLE 5

Copolymerization of Sodium Allylsulfonate and N-Methylmaleimide

A 150 mL reactor is charged with sodium allylsulfonate (7.6 g; 0.053 mole), N-methylmaleimide (5.9 g; 0.053 mole) and glacial acetic acid (30 g). The reaction mixture is degassed by freeze-thawing three times under vacuum. Nitrogen is introduced after the last thaw cycle; AIBN (640 mg) is then added. The reaction mixture is heated in an oil bath at 80° C. for 20 hours. To isolate the copolymer product, approximately one half of the acetic acid is removed by distillation and 40 mL of ethylbenzene added with agitation of the reaction product to yield a precipitate. The precipitate is collected by filtration, washed with ethyl benzene once, and washed with hexanes twice. The recovered copolymer is dried in a vacuum oven at 60° C. (1 torr) until a constant weight is obtained. The copolymer is expected to be a 1:1 alternating copolymer having the structure:

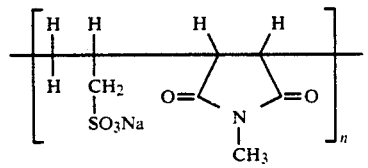

EXAMPLE 6

This example illustrates the preparation of a 1:1 alternating copolymer of sodium vinyl sulfonate and N-ethyl maleimide. A two liter glass reactor equipped with a mechanical stirrer and thermometer is charged with sodium vinyl sulfonate (130 g; 1.0 mole), N-ethyl maleimide (125 g; 1.0 mole), and anhydrous dimethyl formamide (750 g). After bubbling nitrogen through the stirred mixture for 30 minutes, the mixture is heated at 80° C. until the comonomers dissolve in the dimethyl formamide. A 2.4 g portion of 2,2'-azo-bis(2-methylbutane nitrile) is then added and the resulting mixture heated 24 hours at 100° C. under a nitrogen atmosphere. Approximately one-half of the solvent is removed under reduced pressure and the copolymer product precipitated from solution by addition of toluene. The precipitate is recovered by filtration, washed with additional toluene, and dried to constant weight in a vacuum oven. The structure of the alternating copolymer thus obtained, having an expected peak molecular weight of between about 500 and 30,000, should be

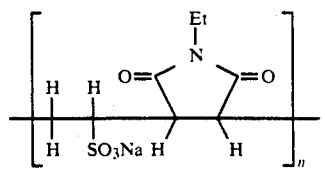

EXAMPLE 7

The preparation of a 1:1 alternating copolymer of potassium allylsulfonate and maleimide using the process of this invention is shown by this example. A three liter glass reactor equipped with a mechanical stirrer and thermometer is charged with potassium allylsulfonate (160 g; 2.0 mole), maleimide (97 g; 1.0 mole), and anhydrous propionic acid (1100 g). After bubbling argon through the stirred mixture for 30 minutes, 1,1'-azo-1-cyclohexane carbonitrile (5.7 g) is added and the mixture heated 36 hours at 90° C. under an argon atmosphere. Approximately one-half of the solvent is removed under reduced pressure and the copolymer product precipitated from solution by the addition of diethyl ether. The precipitate is recovered by filtration, washed with additional diethyl ether, and then dried to constant weight in a vacuum oven. The structure of the copolymer thus obtained, having an expected peak molecular weight of between about 500 and 30,000, is expected to be as follows:

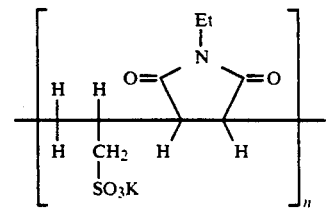

EXAMPLE 8

This example illustrates the preparation of a copolymer of sodium 2-phenyl allylsulfonate, maleimide, and N-phenyl maleimide. A two liter glass reactor equipped with a mechanical stirrer and thermometer is charged with sodium 2-phenyl allyl sulfonate (220 g; 1.0 mole), maleimide (48.5 g; 0.5 mole), N-phenyl maleimide (86.5 g; 0.5 mole), and diethyl formamide (650 g). After purging the reaction vessel with nitrogen, 2,2'-azo bis-(2-acetoxy propane) (16.25 g) is added and the resulting mixture heated 12 hours at 110° C. under nitrogen. Approximately one-half of the solvent is removed under reduced pressure and the copolymer product precipitated from solution by addition of hexane. The precipitated copolymer is recovered by filtration, washed with additional hexane, and then dried to constant weight in a vacuum oven. The structure of the copolymer thus obtained, having an expected peak molecular weight of between about 500 to 30,000, should be as follows:

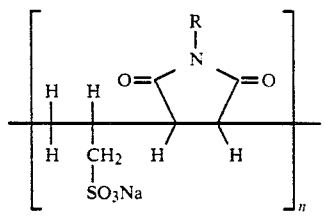

wherein about 50 percent of the R groups in the copolymer are hydrogen and about 50 percent of the R groups are phenyl.

EXAMPLE 9

This example demonstrates the preparation of a copolymer containing 2 equivalents of maleimide per equivalent of sodium methallylsulfonate. A 150 ml reactor was charged with recrystallized sodium methallylsulfonate (9.5 g; 0.06 mole), maleimide (12.0 g; 0.12 mole), deionized water (60 ml), and potassium persulfate (800 mg) under a nitrogen atmosphere. The reaction mixture was heated at 40° C. for 18 hours and then added dropwise with stirring to 500 ml methanol. The resulting precipitate was filtered, washed with methanol, and dried in a vacuum oven (1 torr) until a constant weight of copolymer was obtained (21 g; 98% yield). Elemental analysis (nitrogen and sulfur) indicated that the product was a 2:1 copolymer of maleimide and sodium methallylsulfonate. The copolymer had a peak molecular weight of 17,000 as determined by gel permeation chromatography.

EXAMPLE 10

This example illustrates the copolymerization of sodium methallylsulfonate and maleimide in a 1:1 molar ratio using water as the reaction medium and potassium persulfate as the free radical initiator.

A 150 ml reactor was charged with recrystallized sodium methallylsulfonate (9.5 g; 0.06 mole), maleimide (6.0 g; 0.06 mole), deionized water (40 ml), and potassium persulfate (800 mg) under a nitrogen atmosphere. The reaction mixture was heated at 40° C. for 18 hours and then poured into 400 ml methanol to precipitate the copolymer product. The colorless precipitate was collected by filtration, washed with methanol, and dried in a vacuum oven (1 torr) until a constant weight of 13.0 g (84% yield) was obtained. The copolymer was found to be a 1:1 alternating copolymer by $^{13}C$ NMR and elemental analysis and had a peak molecular weight of 5,000 by gel permeation chromatography.

EXAMPLE 11

This example demonstrates the preparation of a terpolymer containing $\alpha,\beta$-unsaturated dicarboxylic acid anhydride recurring units.

The polymerization of Example 1 is repeated using sodium methallyl sulfonate (9.5 g; 0.05 mole), maleimide (3.0 g; 0.03 moles), and maleic anhydride (2.9 g; 0.03 mole) as the comonomers. The structure of the copolymer thus obtained, having an expected peak molecular weight of between about 1500 to 20,000, is expected to be

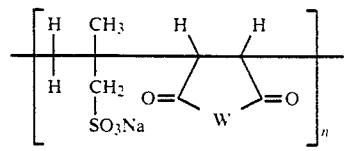

wherein about 50 percent of the W groups are O (oxygen) and about 50 percent of the W groups are NH.

I claim:

1. A copolymer comprised of
  a) recurring polymerized units of an olefinically unsaturated sulfonate salt having the general structure;

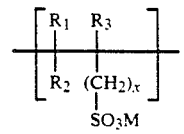

wherein $R_1$, $R_2$, and $R_3$ are the same or different and are independently selected from the group consisting of hydrogen and $C_1-C_6$ alkyl, x is 0, 1, or 2, and M is an alkali metal, alkaline earth or ammonium;

b) recurring polymerized units of an $\alpha,\beta$-unsaturated dicarboxylic acid imide having the general structure:

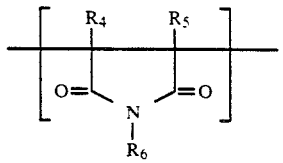

wherein $R_4$, $R_5$, and $R_6$ are the same or different and are independently selected from the group consisting of hydrogen, phenyl, tolyl, halophenyl, nitrophenyl, xylyl, mesityl, cumenyl, naphthyl, anthryl, benzyl, phenethyl, and $C_1-C_6$ alkyl; and c) optionally, recurring polymerized units of an $\alpha,\beta$-unsaturated dicarboxylic acid anhydride; said copolymer having a peak molecular weight of from about 500 to 30,000.

2. The copolymer of claim 1 wherein the copolymer is substantially alternating in structure and wherein the sulfonate salt and dicarboxylic acid imide recurring polymerized units are present in an equimolar ratio.

3. The copolymer of claim 1 wherein the copolymer has a peak molecular weight of from about 1500 to 20,000.

4. The copolymer of claim 1 wherein $R_1$ and $R_2$ are hydrogen, $R_3$ is hydrogen or methyl, x is 1, and M is sodium or potassium.

5. The copolymer of claim 1 wherein $R_4$, $R_5$ and $R_6$ are hydrogen.

6. The copolymer of claim 1 wherein the molar proportion of (a+c):(b) is from about 80:20 to 20:80.

7. A copolymer comprised of
  a) recurring polymerized units of an olefinically unsaturated sulfonic salt having the general structure

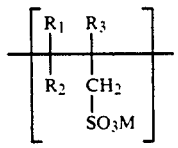

wherein $R_1$ and $R_2$ are hydrogen, $R_3$ is hydrogen or methyl, and M is sodium or potassium; and b) recurring polymerized units of an $\alpha,\beta$-unsaturated dicarboxylic acid imide having the general structure

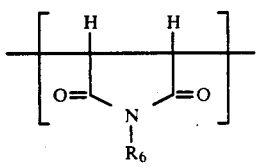

wherein $R_6$ is hydrogen, methyl, ethyl, or phenyl; wherein the peak molecular weight of the copolymer is from about 1500 to 20,000 and the molar proportion of (a):(b) is from about 80:20 to 20:80.

8. The copolymer of claim 7 wherein the copolymer is substantially alternating in structure and the sulfonate salt and dicarboxylic acid imide recurring units are present in an equimolar ratio.

9. The copolymer of claim 7 wherein $R_3$ is methyl.

10. The copolymer of claim 7 wherein M is sodium.

11. The copolymer of claim 7 wherein $R_6$ is hydrogen.

12. The copolymer of claim 7 wherein $R_6$ is phenyl.

13. The copolymer of claim 1 wherein at least a portion of the $\alpha,\beta$-unsaturated dicarboxylic acid imide recurring polymerized units are converted to dicarboxylate moieties, wherein each dicarboxylate moiety has:
 (a) a first carboxylic acid amide functional group; and
 (b) a carboxylate functional group selected from the group consisting of;
  (i) a carboxylic acid functional group;
  (ii) a carboxylic acid salt functional group;
  (iii) a carboxylic acid ester functional group; and
  (iv) a second carboxylic acid amide functional group which is the same as or different from the first carboxylic acid amide functional group.

14. The alternating copolymer of claim 13 wherein the carboxylate functional group is a carboxylic acid functional group, carboxylic acid salt functional group, carboxylic acid ester functional group, or carboxylic acid amide functional group having the general structure:

wherein Y is O or NZ, wherein Z is hydrogen, aryl or $C_1$-$C_6$ alkyl, and X is hydrogen, ammonium, $C_1$-$C_6$ alkyl, alkali metal or alkaline earth, with the proviso that when Y is NZ, X is either hydrogen, aryl or $C_1$-$C_6$ alkyl.

15. The alternating copolymer of claim 13 wherein the carboxylate functional group is a carboxylic acid functional group having the general structure:

16. The alternating copolymer of claim 13 wherein the carboxylate functional group is a carboxylic acid salt functional group having the general structure:

wherein X is ammonium, alkali metal, or alkaline earth.

17. The alternating copolymer of claim 13 wherein the carboxylate functional group is a carboxylic acid ester functional group having the general structure:

wherein X is $C_1$-$C_6$ alkyl.

18. The alternating copolymer of claim 13 wherein the carboxylate functional group is a second carboxylic acid amide functional group having the general structure:

wherein Z is hydrogen, aryl or $C_1$-$C_6$ alkyl and X is hydrogen, aryl or $C_1$-$C_6$ alkyl.

19. The copolymer of claim 13 wherein the first carboxylic acid amide functional group has the general structure:

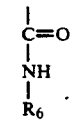

wherein $R_6$ is selected from the group consisting of hydrogen, phenyl, tolyl, halophenyl, nitrophenyl, xylyl, mesityl, cumenyl, naphthyl, anthryl, benzyl, phenethyl and $C_1$-$C_6$ alkyl.

* * * * *